United States Patent [19]
Blackman et al.

[11] Patent Number: 5,778,358
[45] Date of Patent: Jul. 7, 1998

[54] QUERY PARSER FOR ACCESSING NON-RELATIONAL, NON-OBJECT-ORIENTED DATASTORES

[75] Inventors: Kenneth R. Blackman, San Jose; Jack L. Howe, III, Gilroy, both of Calif.

[73] Assignee: International Business Machines Corporation, Armonk, N.Y.

[21] Appl. No.: 738,082

[22] Filed: Oct. 25, 1996

[51] Int. Cl.$^6$ ................................. G06F 17/30
[52] U.S. Cl. ................. 707/3; 707/103; 707/4
[58] Field of Search ................ 707/3–5, 103; 395/500

[56] References Cited

U.S. PATENT DOCUMENTS

| | | | |
|---|---|---|---|
| 5,161,225 | 11/1992 | Abraham et al. | 707/103 |
| 5,212,787 | 5/1993 | Baker et al. | 707/101 |
| 5,291,583 | 3/1994 | Bapat | 395/500 |
| 5,295,256 | 3/1994 | Bapat | 345/500 |
| 5,297,279 | 3/1994 | Bannon et al. | 707/103 |
| 5,303,379 | 4/1994 | Khoyi et al. | 395/710 |
| 5,414,812 | 5/1995 | Filip et al. | 707/103 |
| 5,421,015 | 5/1995 | Khoyi et al. | 395/677 |
| 5,426,747 | 6/1995 | Weinreb et al. | 395/413 |
| 5,437,027 | 7/1995 | Bannon et al. | 707/103 |
| 5,459,860 | 10/1995 | Burnett et al | 707/101 |
| 5,499,371 | 3/1996 | Henninger et al. | 395/702 |
| 5,542,078 | 7/1996 | Martel et al. | 707/101 |

OTHER PUBLICATIONS

Kenneth J. Muckenhaupt, "Preserving Current Assets With Objects on MVS White Paper", Mar 1996, 21 pages, at http://www.s390.ibm.com/products/wp/wrapwp.html.

"IMS in an Object Oriented World", IBM Corporation, San Jose, CA, Jul. 12, 1995, pp. 1–53.

Inventor Jack L. Howe, III, IMS/OO—Overview: Objects in IMS Are Closer Than They Appear, IBM Corporation, overheads from presentation at SHARE 95, Feb. 23, 1995, (see entire document).

Inventor Jack L. Howe, III, "Objects in the IMS are Closer Than They Appear", IBM Corporation, overheads from presentation at IBM Technical Interchange '95, May 20, 1995, (see entire document).

"Voyager/C++ Client/Server Object Management System", Secant Technologies Inc., 1995, (see entire document).

*Primary Examiner*—Paul V. Kulik
*Attorney, Agent, or Firm*—Merchant, Gould, Smith, Edell, Welter, & Schmidt

[57] ABSTRACT

A method, apparatus, and article of manufacture for querying a non-relational, non-object-oriented datastore using objected-oriented techniques. A computerized system in accordance with the principles of the present invention includes a "bridge" for receiving a query request to retrieve data from the external datastore, for parsing the query request according to a specified syntax, and for storing the parsed query request in a query object, wherein the query object is later accessed to direct the retrieval of data from the external datastore.

27 Claims, 7 Drawing Sheets

QUERY PARSER FOR ACCESSING NON-RELATIONAL, NON-OBJECT-ORIENTED DATASTORES

CROSS-REFERENCE TO RELATED APPLICATIONS

This application is related to the following co-pending and commonly-assigned patent applications:

Application Ser. No. 08/736,762, entitled "A FRAMEWORK FOR OBJECT-ORIENTED ACCESS TO NON-OBJECT-ORIENTED DATASTORES," filed on same date herewith, by Kenneth R. Blackman and Jack L. Howe III;

Application Ser. No. 08/736,763, entitled "A METHOD FOR REPRESENTING NON-OBJECT-ORIENTED DATASTORES USING A COLLECTION OF COLLECTIONS DATA MODEL," filed on same date herewith, by Kenneth R. Blackman and Jack L. Howe III;

Application Ser. No. 08/738,294, entitled "A METHOD FOR THE INCREMENTAL PRESENTATION OF NON-OBJECT-ORIENTED DATASTORES USING AN OBJECT-ORIENTED QUERYABLE DATASTORE COLLECTION," filed on same date herewith, by Kenneth R. Blackman and Jack L. Howe III;

Application Ser. No. 08/738,104, entitled "A QUERY SYNTAX FOR ACCESSING NON-RELATIONAL, NON-OBJECT-ORIENTED DATASTORES," filed on same date herewith, by Kenneth R. Blackman and Jack L. Howe III;

Application Ser. No. 08/738,330, entitled "A METHOD FOR USING A DATASTORE CURSOR FOR THE INCREMENTAL PRESENTATION OF QUERY RESULTS WHEN TRAVERSING IMPLIED COLLECTIONS IN NON-OBJECT-ORIENTED DATASTORES," filed on same date herewith, by Kenneth R. Blackman and Jack L. Howe III;

Application Ser. No. 08/736,759, entitled "A METHOD FOR REPRESENTING DATA FROM NON-RELATIONAL, NON-OBJECT-ORIENTED DATASTORES AS QUERYABLE DATASTORE PERSISTENT OBJECTS," filed on same date herewith, by Kenneth R. Blackman and Jack L. Howe III;

Application Ser. No. 08/736,764, entitled "A METHOD FOR ENCAPSULATING DATA FROM NON-OBJECT-ORIENTED DATASTORES AS DATASTORE PERSISTENT OBJECTS," filed on same date herewith, by Kenneth R. Blackman and Jack L. Howe III;

Application Ser. No. 08/738,103, entitled "A METHOD FOR USING QUERYABLE PERSISTENT IDENTIFIERS TO LOCATE DATA FOR DATASTORE PERSISTENT OBJECTS IN NON-OBJECT-ORIENTED DATASTORES," filed on same date herewith, by Kenneth R. Blackman and Jack L. Howe III;

Application Ser. No. 08/736,983, entitled "A METHOD FOR INTERFACING QUERYABLE DATASTORE PERSISTENT OBJECTS TO NON-RELATIONAL, NON-OBJECT-ORIENTED DATASTORES," filed on same date herewith, by Kenneth R. Blackman and Jack L. Howe III;

Application Ser. No. 08,736,952, entitled "A METHOD FOR MANAGING QUERYABLE DATASTORE PERSISTENT OBJECTS AND QUERYABLE DATASTORE COLLECTIONS IN AN OBJECT-ORIENTED ENVIRONMENT," filed on same date herewith, by Kenneth R. Blackman and Jack L. Howe III;

Application Ser. No. 08/736,765, entitled "A METHOD FOR CATALOGING DATASTORE CHARACTERISTICS AND GENERATING DATASTORE PERSISTENT OBJECTS," filed on same date herewith, by Kenneth R. Blackman and Jack L. Howe III;

Application Ser. No. 08/738,102, entitled "A METHOD FOR CAPTURING AND CATALOGING SPECIFICATIONS FOR DATASTORE PERSISTENT CLASSES," filed on same date herewith, by Kenneth R. Blackman and Jack L. Howe III;

Application Ser. No. 08/736,861, entitled "A METHOD FOR CAPTURING AND CATALOGING PROGRAM CHARACTERISTICS FOR THE USAGE OF DATASTORE PERSISTENT CLASSES," filed on same date herewith, by Kenneth R. Blackman and Jack L. Howe III;

Application Ser. No. 08/738,105, entitled "A METHOD FOR USING A NON-OBJECT-ORIENTED DATASTORE AS A GENERIC PERSISTENT DATASTORE FOR PERSISTENT OBJECTS," filed on same date herewith, by Kenneth R. Blackman and Jack L. Howe III;

all of which applications are incorporated by reference herein.

BACKGROUND OF THE INVENTION

1. Field of the Invention

The present invention relates generally to computerized methods for accessing datastores, and in particular, to a computerized object-oriented method for accessing non-object-oriented datastores.

2. Description of Related Art

It is well known in the art to use database management systems, such as IBM's IMS™ (Information Management System) database management system, to manage computerized datastores. Indeed, IMS™ has been used for decades and remains in use today. Currently, there is a need to access such "legacy" datastores using application programs developed by object-oriented programming systems (OOPS). However, there are few tools available to assist OOPS programmers.

One method for allowing object-oriented application programs to access data in an IMS™ datastore is through transaction wrappering, implemented in such products such as IBM's VisualAge™ IMS Connection product. Transaction wrappering creates a class having methods that retrieve data from the IMS™ datastore, create an object embodying the retrieved data, and manipulate the object in an object-oriented application program. The problem with this approach is that each object-oriented application requires substantial additional coding, both object-oriented and non-object-oriented, before it is able to access the data in the IMS™ datastore.

Another approach to accessing data in a non-relational, non-object-oriented datastore is to translate the non-relational datastore to a relational datastore, and use existing object-oriented programming techniques developed for relational datastores to access the data therein. The problem with this approach is that non-relational data, such as the hierarchical data found in an IMS™ datastore, does not map well to a relational datastore.

Thus, there is a need in the art for improved techniques for bridging between non-object-oriented datastores and object-oriented application programs.

SUMMARY OF THE INVENTION

To overcome the limitations in the prior art described above, and to overcome other limitations that will become apparent upon reading and understanding the present specification, the present invention discloses a method, apparatus and article of manufacture for querying non-object-oriented datastores using object-oriented techniques. A computerized system in accordance with the principles of the present invention includes a "bridge," for receiving a query request to retrieve data from the external datastore, for parsing the query request according to a specified syntax, and for storing the parsed query request in a query object, wherein the query object is later accessed to direct the retrieval of data from the external datastore.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
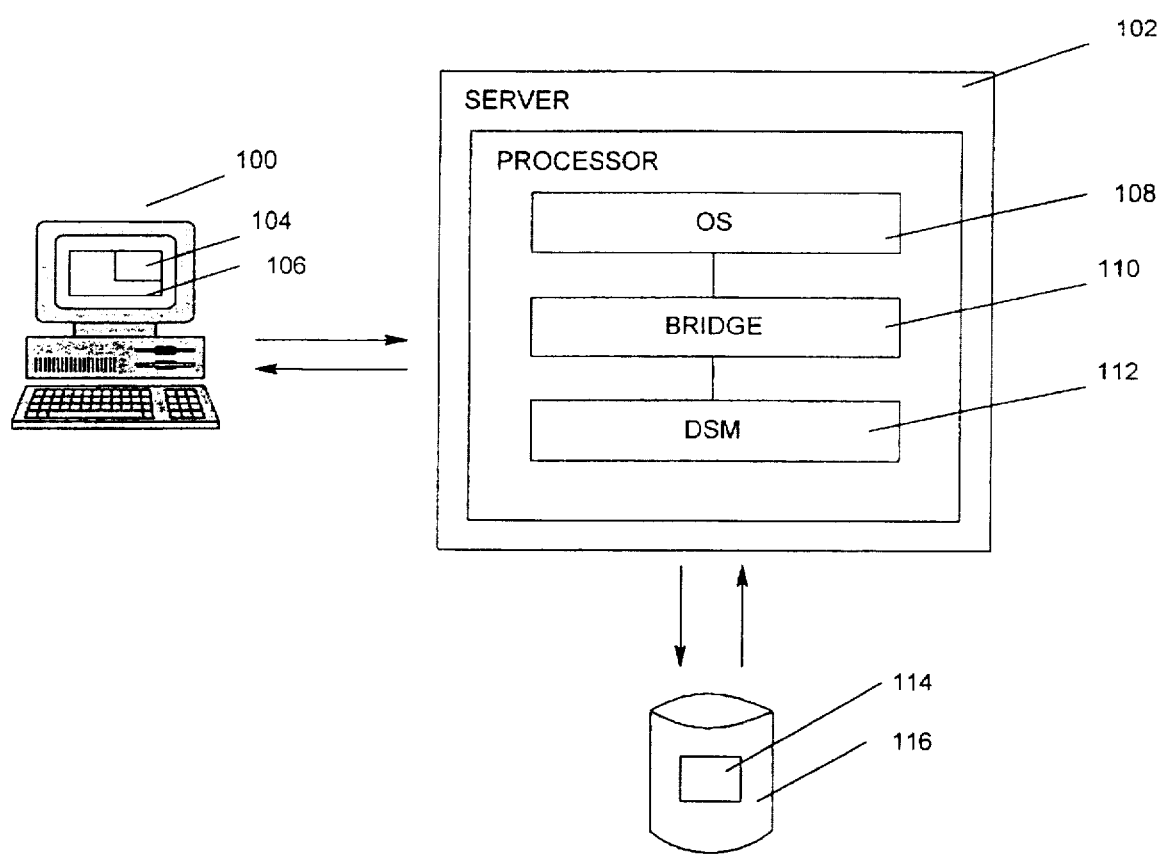
FIG. 1 is a block diagram illustrating an exemplary hardware environment used to implement the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Overview The present invention provides a query parser for accessing non-relational, non-object-oriented datastores. A computerized system in accordance with the principles of the present invention includes a "bridge" for receiving a query request to retrieve data from the external datastore, for parsing the query request according to a specified syntax, and for storing the parsed query request in a query object, wherein the query object is later accessed to direct the retrieval of data from the external datastore.
Hardware Environment FIG. 1 is a block diagram illustrating an exemplary hardware environment used to implement the preferred embodiment of the invention. A workstation or terminal 100 communicates with a server computer 102. Both the workstation 100 and the server computer 102 are typically comprised of one or more processors, random access memory (RAM), read-only memory (ROM), and other components such as data storage devices and data communications devices.

The workstation 100 executes one or more computer programs 104 operating under the control of an operating system 106, such as the MVS™, VM™, AIX™, OS/2™, Windows™, Macintosh™, AS/400™, or UNIX™ operating systems. These computer programs 104 transmit commands to the server computer 102 for performing various functions and receive data from the server computer 102 in response to the commands.

The server computer 102 also operates under the control of an operating system 108, such as the MVS™, VM™, AIX™, OS/2™, Windows™, Macintosh™, AS/400™, or UNIX™ operating systems. The server computer 102 executes one or more computer programs 110 and 112 under the control of the operating system 108. These computer programs 110 and 112 receive commands from the workstation 100 for performing various functions and transmit data to the workstations 100 in response to the commands.

The server computer 102 manages one or more external databases or datastores 114 stored on one or more data storage devices 116 (such as a fixed or hard disk drive, a floppy disk drive, a CD-ROM drive, a tape drive, or other device). In the preferred embodiment, the external datastore 114 comprises an IMS™ datastore managed by an IMS™ database management system (DBMS) product offered by IBM Corporation. Those skilled in the art will recognize, however, that the present invention may be applied to any datastore and associated database management system.

The present invention is generally implemented using five major components executed by the workstation 100 and the server computer 102, i.e., object-oriented application program 104, workstation operating system 106, server operating system 108, bridge 110, and datastore manager (DSM) 112, wherein each of these components comprise one or more computer programs. The object-oriented application program 104 performs application functions; the workstation operating system 106 controls the operation of the workstation 100; the server operating system 108 controls the operation of the server computer 102; the bridge 110 materializes data retrieved from the external database 114 as objects; and the datastore manager 112 controls access to the external database 114.

Generally, these computer programs 104–112 are all tangibly embodied in or retrievable from a computer-readable medium, e.g., a data storage device or a data communications device. Moreover, the computer programs are all comprised of instructions which, when read and executed by the workstation 100 and/or server computer 102, causes the workstation 100 and/or server computer 102 to perform the steps necessary to implement and/or use the present invention.

Figure 2:
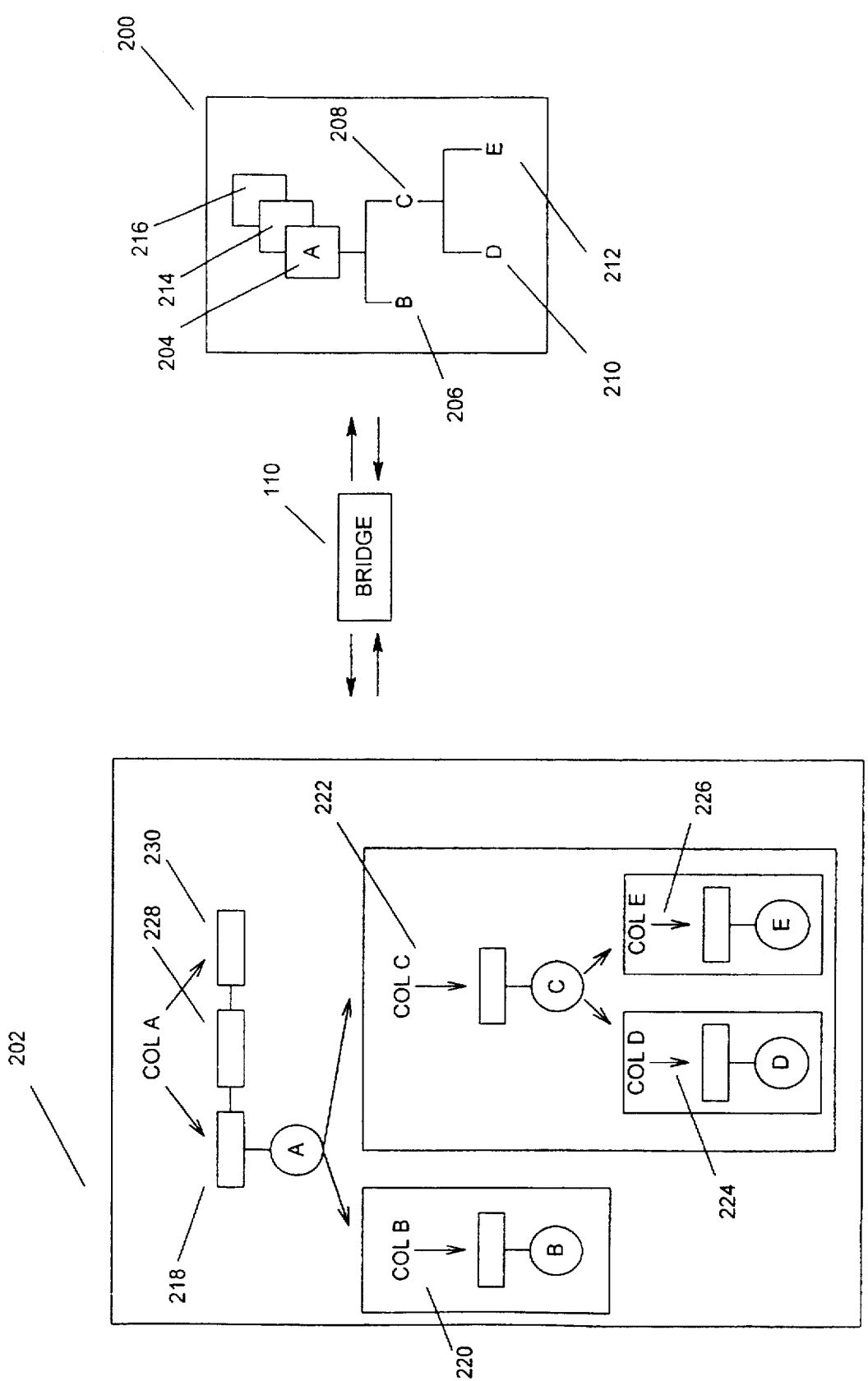
FIG. 2 is a block diagram illustrating a collection of collections data model according to the present invention.

Those skilled in the art will recognize that any combination of the above components, or any number of different components, including computer programs, peripherals, and other devices, may be used to implement the present invention, so long as similar functions are performed thereby.
Datastore Model FIG. 2 is a block diagram illustrating the collection of collections data model used in the present invention. Data retrieved from the non-object-oriented external datastore 114 is modeled as a "collection of object collections" in the bridge 110. Where the external data has a simple structure, each record is encapsulated as an object, which becomes a member of an object collection. Where the records are hierarchical in structure, that hierarchical structure is modeled by creating object collections and then hierarchically connecting the related object collections. Other complex logical records can be modeled as a hierarchy of object collections. A single collection of collections is materialized for each datastore, e.g., the object model of two flat files is a model having two collections of collections.

Block 200 represents the logical hierarchical structure of the data as stored in the external datastore 114, and block 202 represents the logical "collection of object collections" structure created from the data retrieved from the external datastore 114. The bridge 110 translates the data between the differing formats and structures in blocks 200 and 202.

In the logical hierarchical structure of block 200, parent record A (204) has children records B (206) and C (208), and child record C (208) is also a parent of children records D (210) and E (212). There may also be multiple instances of parent record A (214 and 216).

Similarly, in the logical "collection of object collections" structure of block 202, parent object A (218) has children objects B (220) and C (222), and child object C (222) is also a parent of children objects D (224) and E (226). Further, there are multiple instances of parent object A (228 and 230). Each of these objects is a datastore persistent object (DPO) that encapsulates a logical unit of data, i.e., record, retrieved from the non-object-oriented datastore, and includes member functions for manipulating the encapsulated data. Thus, the difference between blocks 200 and 202 is that each record A, B, or C in block 200 is represented by a DPO in block 202, and the hierarchy in block 200 is represented by the collections of object collections in block 202.

Datastore Collection

The bridge 110 manages "datastore collections", which are the foundation of the "collections of object collections" data model. The members of the datastore collection are the DPOs. The datastore collection also includes a query evaluator having a query syntax and a query parser, a queryable datastore cursor, and an associated result collection with a cursor. For complex queries, queries may be sub-divided. Results for the queries are presented in user-specifiable increments, which permits the delivery of large result collections while controlling use of memory.

Figure 3:
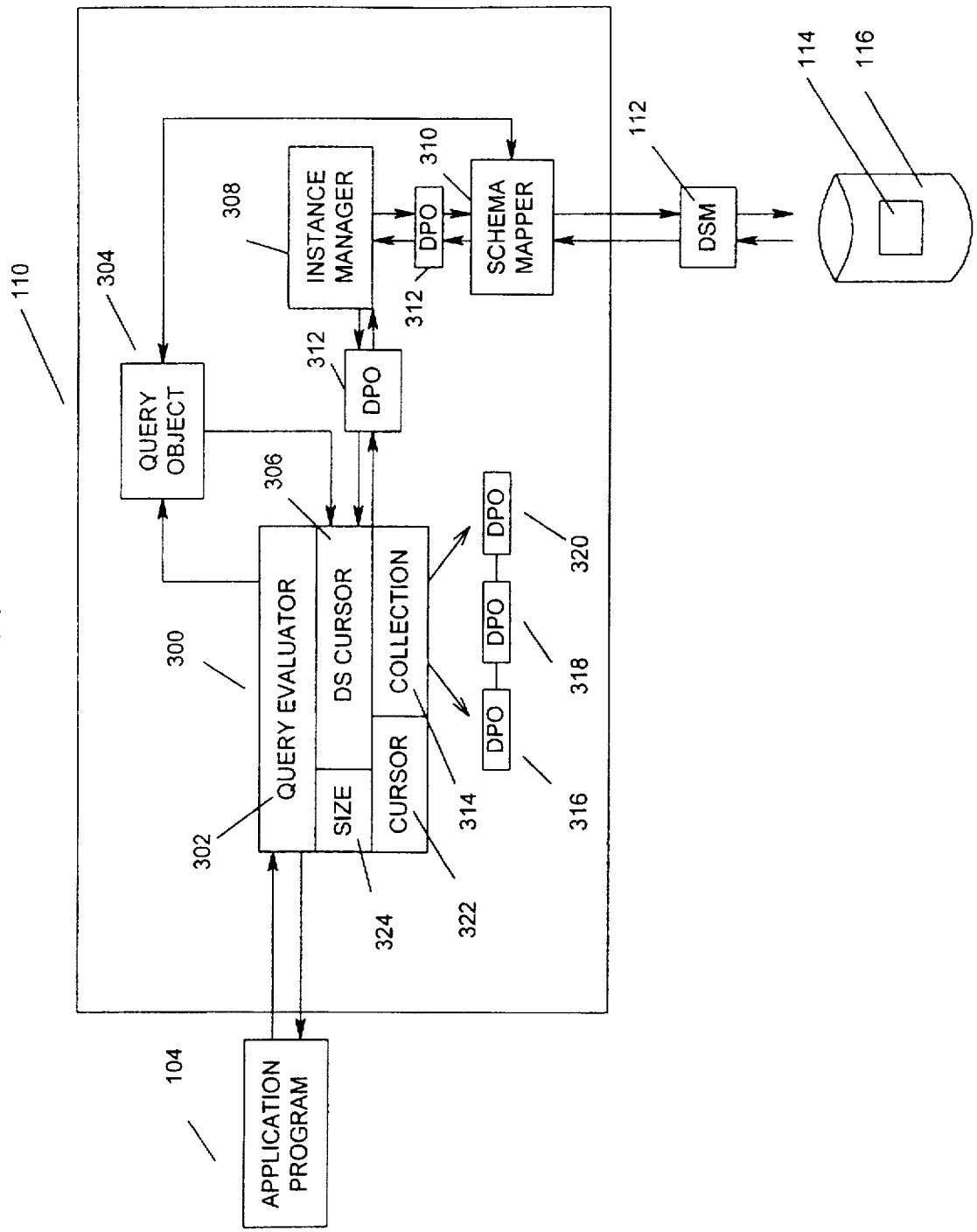
FIG. 3 is a block diagram illustrating an exemplary datastore collection of the bridge according to the present invention.

FIG. 3 is a block diagram illustrating an exemplary datastore collection 300 of the bridge 110 according to the present invention. The datastore collection 300 includes a query evaluator 302 for receiving a query from the application program 104, wherein the query evaluator 302 comprises a query syntax and a query parser. The query evaluator 302 parses the query request in accordance with the query syntax and stores the parsed request in a parse table in a query object 304. A datastore cursor 306 retrieves the parsed query from the query object 304 and provides the parsed query to an instance manager 308, which coordinates requests from the application program 104 with the datastore collection 300 and the external datastore 114. The instance manager 308 uses a schema mapper 310 to interface with the datastore manager 112. The datastore manager 112 retrieves data from the external datastore 114 on the external storage device 116 and returns the requested data to the schema mapper 310. The schema mapper 310 translates common elements between the requested data retrieved from the external datastore 114 and a DPO 312, which results in the requested data being encapsulated in the DPO 312. The schema mapper 310 returns the DPO 312 through the instance manager 308 to the datastore cursor 306 which stores the DPO 312 in the result collection 314. Generally, the result collection 314 comprises one or more DPOs 316, 318, and 320.

The datastore cursor 306 populates the result collection 314 so that the application program 104 can incrementally access the query result. Because the number of data items or records requested by the query may be large, the datastore cursor 306 only populates the result collection 314 with a specified number of DPOs 316, 318, and 320 that correspond to the query request. A pointer to the current DPOs 316, 318, or 320 is maintained by the cursor 322, and the size of the result collection 314 is determined by a size variable 324.

If the application program 104 needs to access more data items or records that satisfy the query, the datastore cursor 306 deletes one or more of the DPOs 316, 318, and 320 from the result collection 314 and requests the instance manager 308, through the schema mapper 310, to retrieve additional DPOs 312, up to the number indicated in the size variable 324, into the result collection 314.

In addition to populating a DPO 312 with data from the external datastore 114, the schema mapper 310 updates the external datastore 114 with changed data from the DPO 312. The schema mapper 310 may add data to the external datastore 114 when a new DPO 312 is created, and the schema mapper 310 may delete corresponding data from the external datastore 114 when a existing DPO 312 is deleted.

The schema mapper 310 translates queries to specific instructions for the datastore manager 112. Generally, these instructions comprise: SELECT, UPDATE, INSERT and DELETE, wherein the SELECT instruction retrieves data from the external datastore 114 via the datastore manager 112 for a DPO 312; the UPDATE instruction, following a SELECT, saves changed data from the DPO 312 into the external datastore 114 via the datastore manager 112; the INSERT instruction saves new data from the DPO 312 into the external datastore 114 via the datastore manager 112; and the DELETE instruction deletes the DPO 312 and its corresponding data from the external datastore 114 via the datastore manager 112.

Datastore Persistent Objects (DPOs)

The members, or elements, of the datastore collection 300 are queryable DPOs 316, 318, and 320 that encapsulate external data, i.e., records retrieved from the external datastore 114, with associated methods to move data with data type integrity between the DPOs 316, 318, and 320, and the records of the external datastore 114. Thus, a DPO 316, 318, and 320 makes non-object-oriented data accessible as "base class objects" that may be used or wrappered by other classes in an object-oriented programming system. Further, the data being encapsulated by the DPO 316, 318, and 320 may or may not be concurrently shared or updated between object-oriented and non-object-oriented applications, depending on the characteristics of the underlying datastore 114.

The bridge 110 thus comprises a queryable persistence implementation that can be used to access data in non-object-oriented datastores 114. The bridge 110 provides a datastore persistent object class to wrapper data retrieved from the external datastore 114, a queryable persistent identifier (PID) used to specify information used to locate the data in the external datastore 114 needed to populate the particular DPO 312, and a schema mapper class used to obtain the required data from the external datastore 114 and translate or transfer it into the format of the particular DPO 312.

Figure 4:
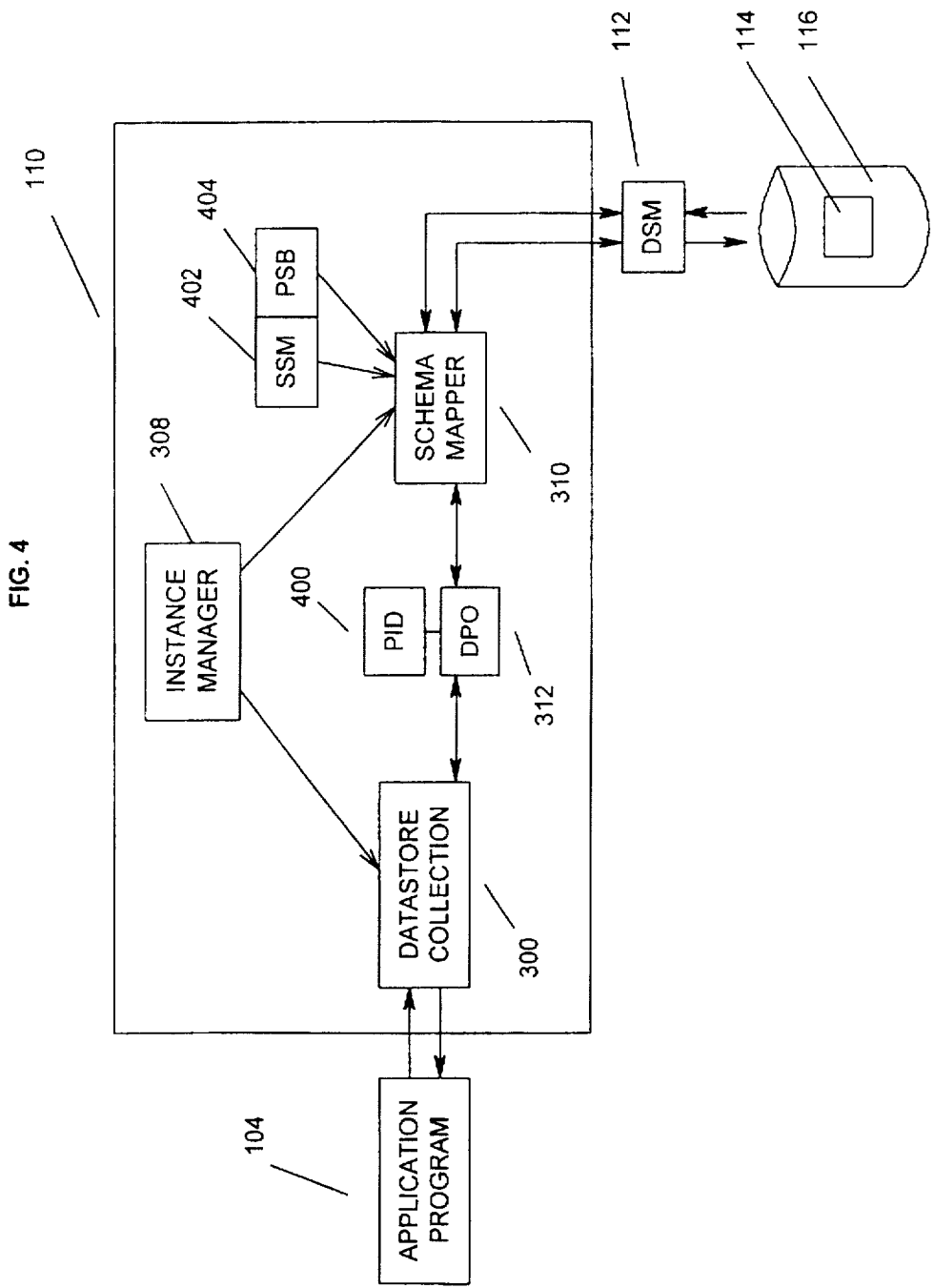
FIG. 4 is a block diagram illustrating the operation of the bridge according to the present invention.

FIG. 4 is a block diagram illustrating the operation of the bridge 110 according to the present invention. The application program 104 passes a query request to the datastore collection 300. The datastore collection 300 evaluates the query and passes control to the datastore cursor 306 for processing. The datastore cursor 306 creates a DPO 312 and its associated PID 400. The PID 400 is used to specify the query information needed to locate the data in the external datastore 114.

The DPO 312 and PID 400 are passed to the instance manager 308 who requests that the schema mapper 310 retrieve the data via the datastore manager 112 for storing into the DPO 312. The schema mapper 310 looks at the DPOs 312 accompanying PID 400 which has information from the query object 304 for locating data. The schema mapper 310 provides the input/output commands to the datastore manager 112 using information from a subschema mapper 402 and program specification block (PSB) 404. The schema mapper 310 receives the located logical unit of data from the datastore manager 112 and maps the located data into the DPO 312, thereby "wrappering" the logical unit of data. Upon completion of the operation, the DPO 312 then encapsulates the data retrieved by the schema mapper 310.

Instance Manager

Figure 5:
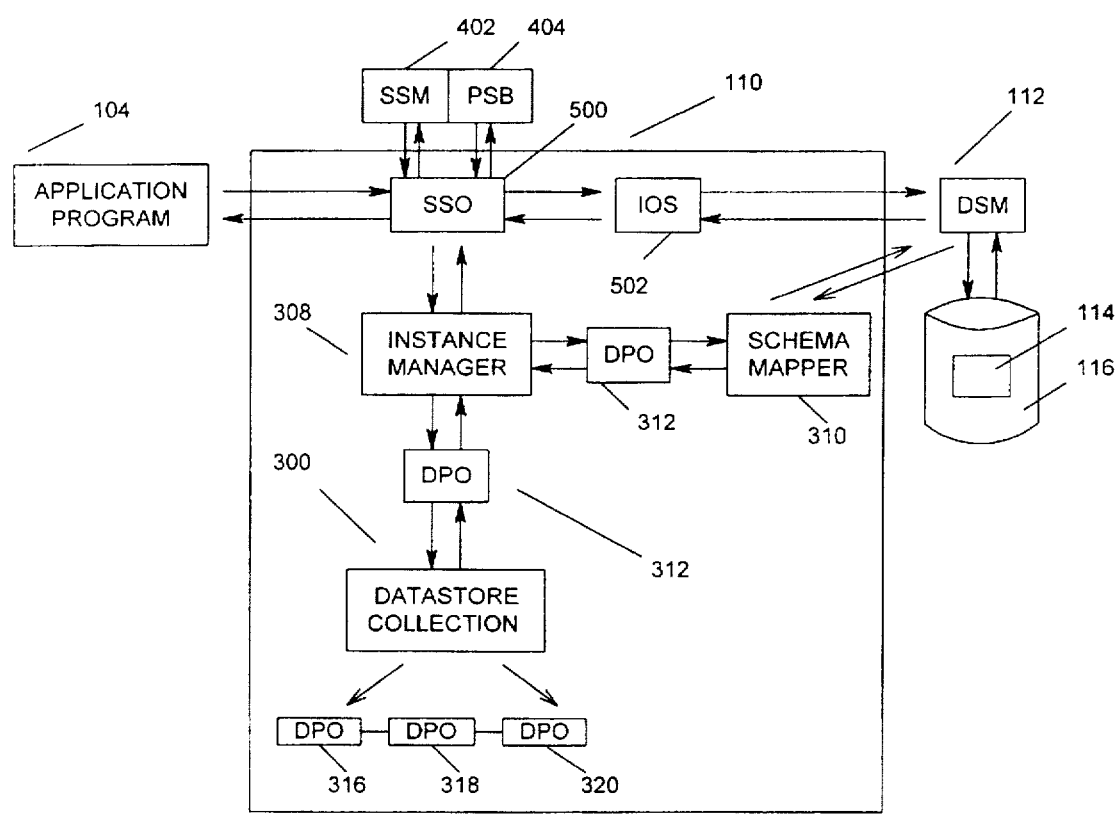
FIG. 5 is a block diagram illustrating the operation of the instance manager of the bridge according to the present invention.

FIG. 5 is a block diagram illustrating the operation of the instance manager 308 according to the present invention.

In the run-time environment, the datastore collections 300 and DPOs 316, 318, and 320 are managed (e.g., created, tracked, materialized, destroyed, and garbage collected) by the instance manager 308. The instance manager 308 also participates in the unit-of-work between the application program 104 being served and the external datastore 114.

Although the interface to the application program 104 remains constant, the level of service provided by the instance manager 308 will vary according to the characteristics of the external datastore 114. The instance manager 308 will exploit the capabilities of the external datastore 114 and the datastore manager 112 wherever possible, e.g., with regard to query functions, concurrency, security, etc.

The instance manager 308 uses service classes to isolate some of its functions, system services object (SSO) 500, interface object services (IOS) 502, and subschema mapper 402. The SSO 500 serves as a "factory" for creating DPO 312 and datastore collections 300 requested by query objects 304. The SSO 500 further serves as a transaction manager for the unit-of-work.

The SSO 500 receives a unit-of-work request from the application program 104. The SSO 500 creates a subschema mapper 402 and opens a PSB 404 for the unit-of-work request. The SSO 500 interfaces to the datastore manager 112 through the IOS 502. The IOS 502 opens and closes the connection to the datastore manager 112.

Using the schema mapper 310, the instance manager 308 populates the datastore collection 300 with DPOs 316, 318, and 320 that encapsulate data retrieved from the external datastore 114 via the datastore manager 112. The schema mapper 310 updates the external datastore 114 with changed data from the DPOs 316, 318, and 320, and adds or deletes the associated elements from the external datastore 114 when the DPOs 316, 318, and 320 are added or deleted.

The SSO 500 propagates a request to complete a unit-of-work to the instance manager 308, the datastore collection 300, the schema mapper 310, and the DPOs 316, 318, and 320, so as to coordinate the requests with the datastore manager 112 to maintain the integrity of the external datastore 114. Upon completion of the unit-of-work, the instance manager 308 deletes the DPOs 316, 318 and 320, the datastore collection 300, and schema mapper 310, from the memory of the server computer 102.

Query Syntax

As indicated above, each query request from an application program 104 is formatted according to a specified query syntax. The query syntax provides for the qualified retrieval of single objects, simple collections of objects, or hierarchically-related collections of objects. In the preferred embodiment of the present invention, the query syntax includes path selections, attribute constraints, and boolean operators.

The path selection comprises a path of hierarchically related classes of objects to traverse, or an individual class of objects. If a path selection is specified in the query, then multiple datastore collections, one for each level of the path selection, are returned to the requesting application program 104. If only an individual datastore persistent object class is selected, then only a single datastore collection for that DPO class is returned to the application program 104.

The attribute constraints provide for the retrieval of DPOs within the path selection that satisfy the attribute constraints. An example attribute constraint is of the form "[field] [relational operator] ["value"] [boolean operator] [ . . . ]", such as "(<date> LT "6/1") AND (<date> LT 5/1)". The boolean operators allow for combinations of attribute constraints. The query syntax further provides the ability to specify constraints for classes that are not part of the path selection. This allows the use of the constraint in a subsequent operation. In a preferred embodiment of the present invention, the query syntax also includes reserved words indicating functions to be performed, such as SELECT, INSERT, UPDATE, and DELETE, wherein: SELECT returns the DPOs that satisfy the attribute constraints; INSERT provides for a single DPO insert, even though the underlying datastore, e.g., an IMS™ datastore, may support a path insert; and UPDATE and DELETE are directed at specific DPOs (identified by PID) and have no parameters.

Query Evaluator

Figure 6:
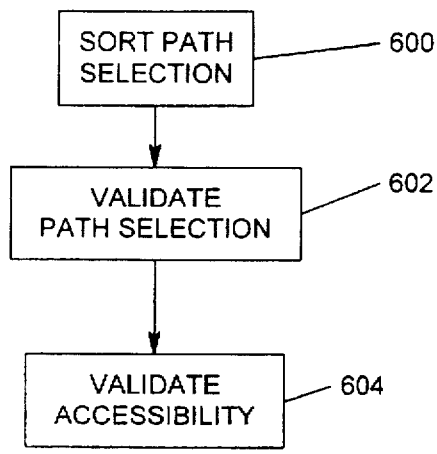
FIG. 6 is a flowchart illustrating the operation of the query evaluator in verifying the syntax of the query request according to the present invention.

FIG. 6 is a flowchart illustrating the operation of the query evaluator 302 (in FIG. 3) in verifying the syntax of the query request according to the present invention. Block 600 represents the query evaluator 302 sorting the path selection into the order corresponding to the structure of the external datastore 114.

Next, block 602 represents the query evaluator 302 validating the path selection by checking if the constraints are syntactically correct, the fields permissible for query, and the sorted path selection corresponds to a valid path in the external datastore 114. The query evaluator 302 ensures that, when the query is performed against the external datastore 114, the only reason for no data being returned is because no matching data exists in the external datastore 114, not because of a mistake in the query syntax.

Block 604 represents the query evaluator 302 validating the ability of the application program 104 to access the requested objects. This check assures that the proper PSB and subschema mapper object are available to support the requested operation.

Datastore Cursor

Figure 7:
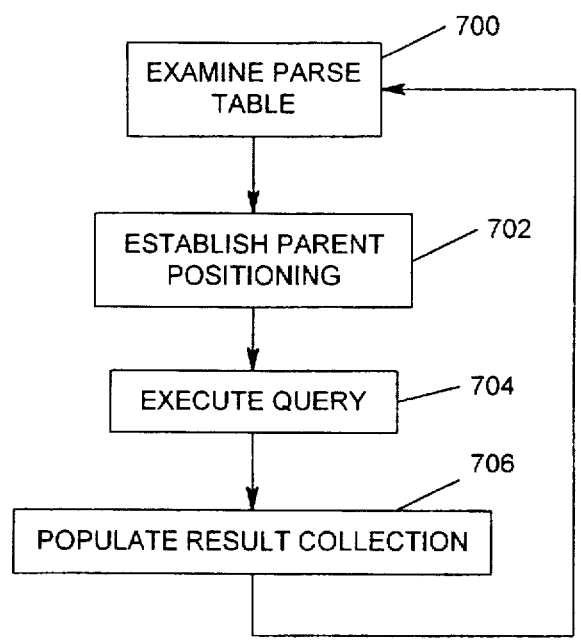
FIG. 7 is a flowchart illustrating the operation of the datastore cursor in performing the query request according to the present invention.

FIG. 7 is a flowchart illustrating the operation of the datastore cursor 306 (in FIG. 3) in performing the query request according to the present invention. Block 700 represents the datastore cursor 306 examining the parse table in the query object 304 to extract the portion of the query pertaining to the datastore collection 300 being queried. Block 702 represents the datastore cursor 304 establishing the proper parent positioning for the datastore collection 300 being queried, based on the examination of the parse table in the query object 304. Block 704 represents the datastore cursor 304 performing the requested query using the established parent positioning to incrementally materialize a DPO 312. Block 706 represents the datastore cursor 304 populating a result collection 314 with the materialized DPO 312. Blocks 700-706 are selectively repeated as requested by the application program 104 through the use of the datastore collection FIRST or NEXT command.

The application program 104 may specify the number of DPOs 316, 318, and 320 in the result collection 306 through the use of the size variable 324. The datastore cursor 304 then retrieves enough DPOs 316, 318, and 320 to fill the result collection 314 and the cursor 322 traverses the members of the result collection 314. The datastore cursor 304 may be directed to obtain the next increment of objects by re-issuing the original query with the datastore collection NEXT command.

The datastore cursor 304 receives the parsed query request from the query evaluator 302, passes the query request to the instance manager 308 and schema mapper 310, receives the DPO 312 retrieved by the schema mapper 310 and populates the result collection 314 with the DPOs 316, 318, and 320.

When an initial query asks for a path, then a collection of object collections is materialized, rather just one collection of objects. A datastore collection 300 will be created for each class in the selected path. A datastore collection 300 for the lowest level in the path is first created, and then datastore collections 300 for parent objects in the requested path are created. However, the datastore collections 300 for parent objects are populated first, followed by the datastore collection for the lowest level.

Refer again to FIG. 2 for an exemplary hierarchical structure for a collection of object collections according to the present invention. Assume that the application program 104 provides an initial query "SELECT A C E WHERE (A) (C) E(/name EQ "Jones") to the query evaluator 302. The instance manager 308 first creates an empty datastore collection E 226. Since the query request was for the path "A C E", the instance manager 308 then creates an empty datastore collection C 222 by retrieving the portion of the query relating to C 222 from the parse table in the query object 304. The instance manager 308 then creates an empty datastore collection A 218 by retrieving the portion of the query relating to A 218 from the parse table in the query object 306. Since A 218 is the top parent, its datastore cursor 304 begins processing the query by obtaining the first A that meets the A constraint. Then control passes to the C 222 datastore collection who, using the current A as parent, obtains the first C that matches the C constraint. Then control passes to the E 222 datastore collection who, using the current A and C as parents, obtains the first E that meets the E constraints.

After a datastore collection is populated, its result collection 314 comprises a collection of DPOs 316, 318, and 320, a size variable 324, and a cursor 322. The result collection 314 provides for the incremental presentation of objects, according to the size variable 324, in order to avoid flooding memory with unnecessary DPOs. The result collection 306 may have less than the number of objects specified in the size variable 324, if the lesser number is all that satisfy the query request.

Following population of the result collection 314, the application program 104 may retrieve one or more objects therefrom, and the collection cursor 322 is used to traverse the result collection 314. The collection cursor maintains a pointer to the current object.

If the application program 104 requests additional objects, beyond the size variable 324, the datastore cursor 306 first performs a "garbage collection" function on the result collection 314. Any DPOs that have been modified are updated in the external datastore 114. After the memory management functions are completed, the datastore cursor 304 examines the parse table in the query object 304 for the portion relating to the requested objects, and the instance manager 308 is instructed to send that portion of the parse table to the schema mapper 310. The datastore cursor 304 goes to the parse table every time because the application program 104 may have used an EVALUATE command to modify the query for a given level. The schema mapper 310 retrieves the next sequence of DPOs 312 and re-populates the result collection 314, up to the size variable 324.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. In addition, the present invention could be used to model other types of information.

In summary, a method, apparatus and article of manufacture for querying non-object-oriented datastores using object-oriented techniques has been described. A computerized system in accordance with the principles of the present invention includes a "bridge" for receiving a query request to retrieve data from the external datastore, for parsing the query request according to a specified syntax, and for storing the parsed query request in a query object, wherein the query object is later accessed to direct the retrieval of data from the external datastore.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for querying non-object-oriented datastores using object-oriented techniques, comprising the steps of:

receiving a query request to retrieve data from an external non-object-oriented datastore stored on a data storage device attached to a computer;

parsing the query request in a memory of the computer according to a specified syntax; and storing the parsed query request in a query object in the memory of the computer, wherein the query object is later accessed to direct the retrieval of data from the external non-object-oriented datastore.

2. The method of claim 1, wherein the parsing step further comprises the step of syntactically verifying the query request.

3. The method of claim 1, wherein the parsing step further comprises the step of verifying an accessibility status of the data.

4. The method of claim 1, wherein the query request includes elements selected from a group comprising path selections, field selections, attribute constraints, and boolean combinations of attribute constraints.

5. The method of claim 4, wherein the path selections are selected from a group comprising hierarchically related collections of data objects and an individual collection of data objects.

6. The method of claim 1, wherein the parsing step further comprises the step of sorting the query request into a proper path sequence.

7. The method of claim 1, wherein the query object further comprises a parse table for storing the parsed query request.

8. The method of claim 1, wherein the parsing step further comprises the step of translating the query request into instructions for a datastore manager.

9. The method of claim 1, further comprising the step of modifying the query object in response to receiving additional query requests.

10. A computerized apparatus for querying non-object-oriented datastores using object-oriented techniques, comprising:
an external non-object-oriented datastore stored on a data storage device attached to a computer; and
a bridge program, executed by a computer, for receiving a query request to retrieve data from the external non-object-oriented datastore, for parsing the query request according to a specified syntax, and for storing the parsed query request in a query object, wherein the query object is later accessed to direct the retrieval of data from the external non-object-oriented datastore.

11. The apparatus of claim 10, wherein the bridge program further comprises means for syntactically verifying the query request.

12. The apparatus of claim 10, wherein the bridge program further comprises means for verifying an accessibility status of the data.

13. The apparatus of claim 10, wherein the query request includes elements selected from a group comprising path selections, field selections, attribute constraints, and boolean combinations of attribute constraints.

14. The apparatus of claim 13, wherein the path selections are selected from a group comprising hierarchically related collections of data objects and an individual collection of data objects.

15. The apparatus of claim 10, wherein the bridge program further comprises means for sorting the query request into a proper path sequence.

16. The apparatus of claim 10, wherein the query object further comprises a parse table for storing the parsed query request.

17. The apparatus of claim 10, wherein the bridge program further comprises means for translating the query request into instructions for a datastore manager.

18. The apparatus of claim 10, wherein the bridge program further comprises means for modifying the query object in response to receiving additional query requests.

19. A program storage medium readable by a computer having a memory, the medium tangibly embodying one or more programs of instructions executable by the computer to perform method steps for querying non-object-oriented datastores using object-oriented techniques, the method comprising the steps of:
receiving a query request to retrieve data from an external non-object-oriented datastore stored on a data storage device attached to a computer;
parsing the query request in a memory of the computer according to a specified syntax; and
storing the parsed query request in a query object in the memory of the computer, wherein the query object is later accessed to direct the retrieval of data from the external non-object-oriented datastore.

20. The method of claim 19, wherein the parsing step further comprises the step of syntactically verifying the query request.

21. The method of claim 19, wherein the parsing step further comprises the step of verifying an accessibility status of the data.

22. The method of claim 19, wherein the query request includes elements selected from a group comprising path selections, field selections, attribute constraints, and boolean combinations of attribute constraints.

23. The method of claim 22, wherein the path selections are selected from a group comprising hierarchically related collections of data objects and an individual collection of data objects.

24. The method of claim 19, wherein the parsing step further comprises the step of sorting the query request into a proper path sequence.

25. The method of claim 19, wherein the query object further comprises a parse table for storing the parsed query request.

26. The method of claim 19, wherein the parsing step further comprises the step of translating the query request into instructions for a datastore manager.

27. The method of claim 19, further comprising the step of modifying the query object in response to receiving additional query requests.

* * * * *